United States Patent
Coffman et al.

(10) Patent No.: US 11,756,061 B2
(45) Date of Patent: Sep. 12, 2023

(54) SYSTEMS AND METHODS FOR MACHINE LEARNING PREDICTIONS OF THE IMPACT OF DIGITAL CONTENT

(71) Applicant: Worldview Incorporated, San Francisco, CA (US)

(72) Inventors: Valerie Coffman, San Francisco, CA (US); James Slezak, San Francisco, CA (US)

(73) Assignee: Worldview Incorporated, San Francisco, CA (US)

(*) Notice: Subject to any disclaimer, the term of this patent is extended or adjusted under 35 U.S.C. 154(b) by 446 days.

(21) Appl. No.: 16/839,354

(22) Filed: Apr. 3, 2020

(65) Prior Publication Data

US 2020/0342472 A1 Oct. 29, 2020

Related U.S. Application Data

(60) Provisional application No. 62/839,318, filed on Apr. 26, 2019.

(51) Int. Cl.
*G06Q 30/00* (2023.01)
*G06Q 30/0203* (2023.01)
*G06N 20/00* (2019.01)

(52) U.S. Cl.
CPC ......... *G06Q 30/0203* (2013.01); *G06N 20/00* (2019.01)

(58) Field of Classification Search
None
See application file for complete search history.

(56) References Cited

U.S. PATENT DOCUMENTS 10,296,642 B1 * 5/2019 Chandran .............. G06Q 50/01
11,107,117 B1 * 8/2021 Calabrese .......... G06Q 30/0244
(Continued)

FOREIGN PATENT DOCUMENTS

| CA | 2794511 A1 * | 9/2011 | ............. G06Q 30/02 |
| EP | 2779073 A1 * | 9/2014 | ......... G06Q 30/0243 |
| WO | WO-2011119899 A2 * | 9/2011 | ............. G06Q 30/02 |

OTHER PUBLICATIONS https://en.wikipedia.org/w/index.php?title=Outlier&oldid=806891525, Oct. 24, 2017 (Year: 2017).*
(Continued)

*Primary Examiner* — Michael Bekerman
(74) *Attorney, Agent, or Firm* — Cognition IP, P.C.; Edward Steakley (57) ABSTRACT

A system, computer readable medium, and method for analyzing digital content of electronic media files includes presenting control media content to a set of control respondents for consumption and presenting test media content to a set of test respondents for consumption. The method includes receiving first responses to a survey related to topics of the control media content from the set of control respondents and second responses to the survey about the test media content from the set of test respondents. The method includes performing feature extraction on the test media content and performing feature extraction on the first responses and the second responses. The feature extraction obtains response features associated with the first responses and the second responses. The method includes training a regression machine learning model with the media content features and the response features.

13 Claims, 4 Drawing Sheets

(56) References Cited

U.S. PATENT DOCUMENTS

| | | | | |
|---|---|---|---|---|
| 2013/0060602 A1* | 3/2013 | Rupp | ............... | G06Q 30/0242 |
| | | | | 705/7.29 |
| 2013/0290094 A1* | 10/2013 | Srivastava | ......... | G06Q 30/0245 |
| | | | | 705/14.44 |
| 2014/0156385 A1* | 6/2014 | Smallwood | ........ | G06Q 30/0245 |
| | | | | 705/14.44 |
| 2015/0186923 A1* | 7/2015 | Gurumoorthy | .... | G06Q 30/0243 |
| | | | | 705/14.42 |
| 2017/0206548 A1* | 7/2017 | Kemp | ............... | G06Q 30/0242 |
| 2019/0188740 A1* | 6/2019 | Xiong | ................... | G06N 20/20 |

OTHER PUBLICATIONS

Woodside, Arch G. "Measuring advertising effectiveness in destination marketing strategies." Journal of Travel Research 29.2 (1990): 3-8. (Year: 1990).*

Newell, Stephen J., and Kenneth V. Henderson. "Super Bowl advertising: Field testing the importance of advertisement frequency, length and placement on recall." Journal of Marketing Communications 4.4 (1998): 237-248. (Year: 1998).*

Bellman, Steven, et al. "What makes a television commercial sell? using biometrics to identify successful ads: demonstrating neuromeasures' potential on 100 mars brand ads with single-source data." Journal of Advertising Research 57.1 (2017): 53-66. (Year: 2017).*

* cited by examiner

FIG. 4 ced with control media content. Additionally, the method includes training a model with the delta between the first corresponding responses and the second corresponding responses. The regression machine learning model, when trained, outputs one or more of an importance indication for one or more of the media content features, a direction of influence for the one or more media content features, and an influence score of the test media content.

SYSTEMS AND METHODS FOR MACHINE LEARNING PREDICTIONS OF THE IMPACT OF DIGITAL CONTENT

CROSS-REFERENCE TO RELATED APPLICATIONS

This application claims the benefit of U.S. Provisional Patent Application No. 62/839,318 filed Apr. 26, 2019, which is hereby incorporated by reference in its entirety.

FIELD

The present disclosure relates generally to digital content analysis and modeling.

BACKGROUND

In the past, determining the impact of media content relied on subjective analysis. Typically, the processes attempted to leverage the human experience of the content creators, or to use focus groups and surveys to test individual pieces of content after they have been produced. These processes, however, required the manual input of many different and unrelated human users and are incapable of establishing causal relationships between features of the digital content and its impact on opinions, beliefs, or intentions. Thus, there is a need for automated and reproducible processes for analyzing digital content.

SUMMARY

In some implementations, a method for analyzing digital content of electronic media files includes determining a set of control respondents and a set of test respondents. The method also includes presenting control media content to the set of control respondents for consumption and presenting test media content to the set of test respondents for consumption. Further, the method includes receiving first responses to a survey about the control media content from the set of control respondents and second responses to the survey related to topics of the test media content from the set of test respondents. The method additionally includes storing the first responses and the second responses in a database, where the database stores the control media content and the test media content. Also, the method includes performing feature extraction on the test media content. The feature extraction obtains media content features associated with the test media content. The method includes performing feature extraction on the first responses and the second responses. The feature extraction obtains response features associated with the first responses and the second responses. The method also includes training a regression machine learning model with the media content features and the response features. The model, when trained, outputs one or more of an importance indication for one or more of the media content features, a direction of influence for the one or more media content features, and an influence score of the test media content.

Additionally, in some implementations, a method for analyzing digital content of electronic media files includes determining a collection of media content for analysis. The collection of media content includes control media content and test media content to the set of test respondents. The method also includes determining a set of respondents to consume the collection of media content. The method also includes dividing the set of respondents into groups. Each respondent in a group consumes one piece of media content from the collection of media content. Further, the method includes receiving, from the set of respondents, responses to a survey related to the topics of the collection of media content after viewing by the set of respondents. The method includes storing the responses in a database. The database stores the collection of media content. Additionally, the method includes performing feature extraction on one or more pieces of media content from the collection of media content. The feature extraction obtains media content features. The method also includes calculating average corresponding responses for one or more questions in the survey from the responses to the survey. The average corresponding responses correspond to a same piece of media from the collection of media content. Further, the method includes calculating a delta between first corresponding responses from the average corresponding responses associated with test media content and second corresponding responses from the average corresponding responses associated with control media content. Additionally, the method includes training a model with the delta between the first corresponding responses and the second corresponding responses. The regression machine learning model, when trained, outputs one or more of an importance indication for one or more of the media content features, a direction of influence for the one or more media content features, and an influence score of the test media content.

Additionally, in some implementations, a method for analyzing digital content of electronic media files includes presenting media content to a set of respondents for consumption. The method also includes receiving responses to a survey related to the topic of the media content from the set of respondents. Further, the method includes performing feature extraction on the media content. The feature extraction obtains media content features associated with the media content. The method also includes performing feature extraction on the responses. The feature extraction obtains response features associated with the responses. Additionally, the method includes analyzing the media content features and the response features to determine an importance indication for one or more of the media content features, a direction of influence for the one or more media content features, and an influence score of the media content.

BRIEF DESCRIPTION OF THE DRAWINGS

The present disclosure will become better understood from the detailed description and the drawings, wherein.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some implementations are implemented by a computer system. A computer system can include a processor, a memory, and a non-transitory computer-readable medium. The memory and non-transitory medium can store instructions for performing methods and steps described herein.

Implementations of the present disclosure are directed to systems and processes that dynamically determine the persuasive or motivational power of media content. In implementations, the systems and processes utilize interpretable machine learning models to understand which features of a piece of media content (e.g., a video, image, sound clip, or text) cause the piece of media content to have an impact on the self-reported beliefs, opinions, and intentions of the audience. The systems and processes also utilize the machine learning models to predict a size or magnitude of the impact a piece of media content will have based on features of the media content that are extracted automatically from a digital copy of the media content. The systems and processes determine and quantify which features of the media content cause that content to have a measurable impact on the self-reported beliefs, opinions, or intentions of an audience with respect to the media content. The systems and processes determine and quantify how the features of the content and personal attributes of individual audience members interact to affect how much the content affects the beliefs, opinions, and intentions held by individual audience members. The systems and processes also predict the degree to which content impacts beliefs, opinions, and intentions overall and individual audience members, based on the features of the content and characteristics of the audience.

According to implementations, the systems and processes establish a data-driven and computerized method of quantifying which features of media content make the content impactful so that content-creators can incorporate features that work and avoid features that don't work to build impactful content about a given topic. The systems and processes also establish a computerized method of predicting how impactful a piece of content will be, without gathering data from human subjects either through surveys or focus groups. As such, the systems and processes can be applied to rough cuts of the media content before investing in production or en masse to media content that is publicly available on the Internet or programmatically generated.

Figure 1:
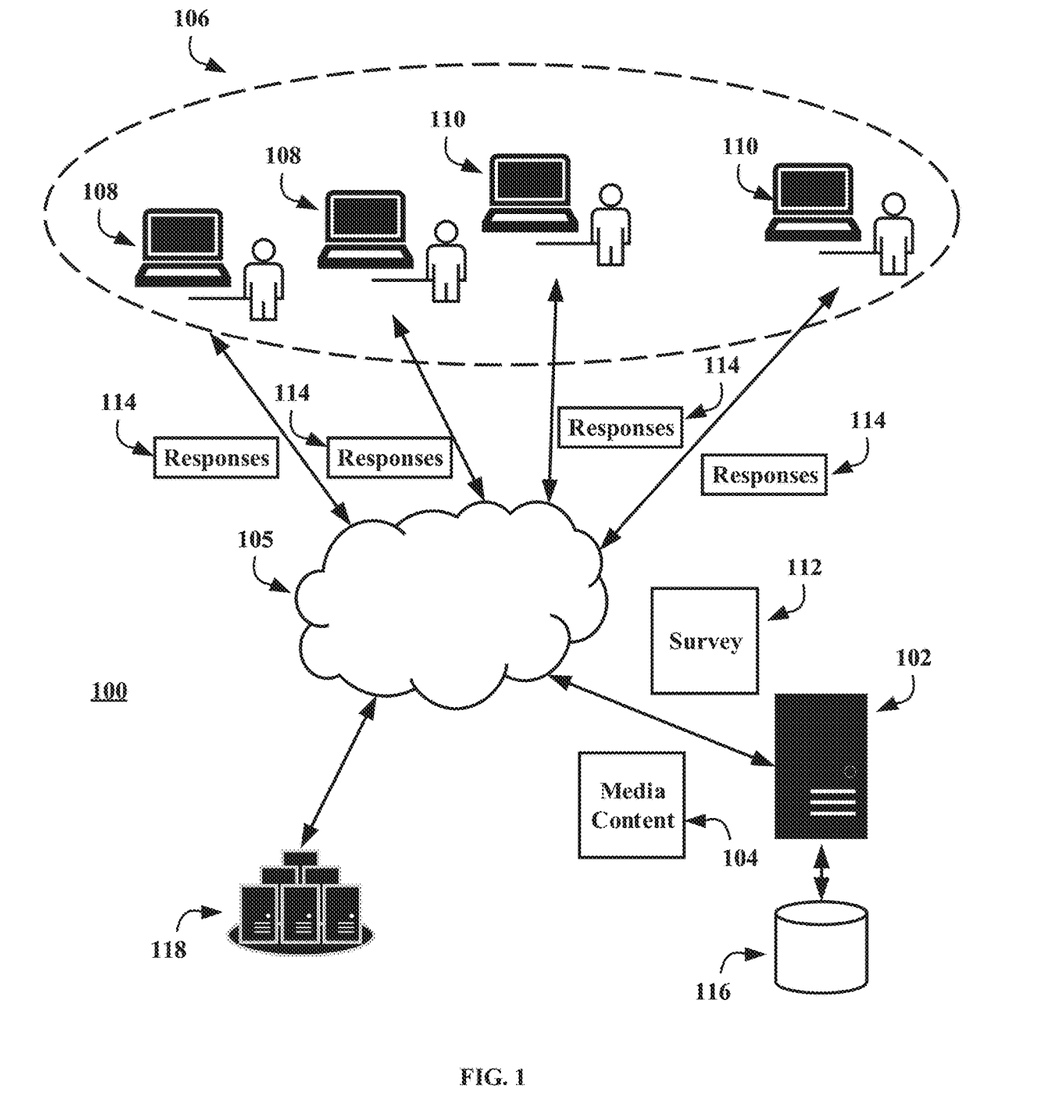
FIG. 1 illustrates a block diagram of an example of a network environment in which digital media content is analyzed, according to various implementations.

FIG. 1 is a block diagram illustrating an example of a network environment 100 that can be used in various implementations. While FIG. 1 illustrates various components contained in the network environment 100, FIG. 1 illustrates one example of the network environment and additional components can be added and existing components can be removed.

As illustrated in FIG. 1, the network environment includes a media content evaluation system 102. The media content evaluation system 102 is configured to provide media content 104, via a network 105, to a group of respondents 106 in order to gauge the impact of the media content 104 on the group of respondents 106. The group of respondents 106 can include test respondents 108 and control respondents 110. The test respondents 108 include human respondents that view a piece of media content 102 that is related to the subject matter or topic under evaluation. The control respondents 110 include human respondents that view a piece of content on a neutral subject or topic.

As described herein, the media content 104 includes any type of media that can be consumed (e.g., viewed, read, listened to, etc.) by a human respondent. For example, the media content 104 can include video, audio, images, text, etc. The media content 104 includes content that potentially evokes an emotional response in a human respondent, potentially persuades a human respondent to a social or political point of view, potentially motivate a human respondent, potentially persuades a human respondent to have a favorable view of a brand, and the like.

The media content evaluation system 102 is configured to provide the media content 104 by any process that allows the group of respondents 106 to consume the media content 104. In some implementations, the media content evaluation system 102 can present the media content 104 in a network application (e.g., web browser) for consumption by the group of respondents 106 via the network 105. In some implementations, the media content evaluation system 102 can transmit an electronic copy of the media content 104 to the group of respondents 106 via the network 105, for viewing on a computer system of the group of respondents 106. In some implementations, the media content evaluation system 102 can provide access and/or a link to an electronic copy of the media content 104 for download via the network 105.

The computer systems utilized by the group of respondents 106 can be any type of computer systems capable of communicating with and interacting with the media content evaluation system 102 and performing the process and methods described herein. As described herein, the computer systems can include any of a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise).

Likewise, the computer systems hosting the media content evaluation system 102 can be any type of computer systems capable of communicating with and interacting with the group of respondents 106 and performing the process and methods described herein. As described herein, the computer systems can include any of a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise).

To gauge the response to the media content 104, the media content evaluation system 102 is configured to provide a survey 112 to the group of respondents 106. In some implementations, the media content evaluation system 102 can present the survey 112 in a network application (e.g., web browser) for consumption and response by the group of respondents 106 via the network 105. In some implementations, the media content evaluation system 102 can transmit an electronic copy of the survey 112 to the group of respondents 106 via the network 105. In some implementations, the media content evaluation system 102 can provide access and/or a link to an electronic copy of the survey 112 for download via the network 105. In some implementations, the survey 112 is provided in a mobile application, in an Internet-enabled addressable TV, on a website, over the Internet, in a web browser, or by other methods.

The survey 112 includes questions that determine demographic, geographic, and behavioral information for the group of respondents 106. The questions can include birth year, gender, ethnicity, postal code, education level, annual income, religion, religiosity, political beliefs, marital status, children living in-home, etc. The survey 112 also includes questions about the respondents' opinions, beliefs, and intentions to act with respect to a subject treated by some of the media content 104. The media content evaluation system 102 can maintain a survey 112 associated with each topic or subject of the media content 104. Each of the surveys 112 can address several different attitudes, beliefs, or behaviors that correspond to a distinct training model.

Once the survey 112 is received, the group of respondents 106 returns responses 114. The responses 114 include answers to the one or more questions included in the survey 112. In some implementations, the group of respondents 106 can enter the responses 114 in the survey 112 in a network application (e.g., web browser). In some implementations, the group of respondents 106 can transmit an electronic copy of the responses 114 to the media content evaluation system 102 via the network 105. In some implementations, the group of respondents 106 can provide access and/or a link to an electronic copy of the responses 114 for download by the media content evaluation system 102 via the network 105.

Once the responses 114 are received, the responses 114 are stored with the survey 112, and the media content 104 in a database 116. The database 116 can be constructed in any form such as table-based or non-table-based database, Structured Query Language (SQL) database, Non SQL (NoSQL) databases, and other forms of data storage. For example, the responses 114, the survey, and the media content 104 can be stored as binary data files. The database 116 can be located in the computer systems operating and supporting the media content evaluation system 102. Likewise, the database 116 can be located remotely from the media content evaluation system 102. Further, while database 116 is illustrated as a single database, the database 116 can include multiple databases, whether stored locally or remotely from the media content evaluation system 102.

Once sufficient data has been collected, the media content evaluation system 102 is configured to analyze the data stored in the database 116 in order to determine features of the media content that influence human respondents and to gauge the impact of the media content 104. The media content evaluation system 102 is configured to extract features from the media content 104 and the responses 114 to the survey 112 and to apply the extracted features to a model. The model is trained to output an importance indication for features of the media content 104 that quantifies how a particular feature influences a human respondent. The model is also trained to output a direction of influence for the features of the media content 104 that indicates whether the features positively or negatively influence the human respondent. The model is also trained to output an influence score for the media content 104 that quantifies how successfully the media content influences the human respondent on a particular subject or topic.

Prior to training a model, the media content evaluation system 102 is configured to transform the data stored in the database 116. The media content evaluation system 102 can perform the transformation in order to compute features by which the model is trained to achieve the desired outputs from the model. The media content evaluation system 102 can be configured to transform the responses 114 received from the group of respondents 106. The media content evaluation system 102 can be configured to calculate individual characteristics of each respondent in the group of respondents 106 based on raw survey answers, (e.g., age from a birth year, local population density from a postal code, etc.) The media content evaluation system 102 can be configured to calculate psychographic data based on the responses 114. For example, the media content evaluation system 102 can be configured to compute a psychographic index by averaging the responses of multiple related questions together using, for example, a statistical techniques known as an "index of multiple measures" (IMM).

Additionally, the media content evaluation system 102 can be configured to perform data conditioning processes on the responses 114, for example, outlier dropping, quality checks, etc. For example, the media content evaluation system 102 can be configured to drop responses 114 due to duplication or other quality issues such as failing an attention check question, submitting a response from outside the targeted locale, and/or determining that the respondent is not a valid respondent (e.g., spammer).

The media content evaluation system 102 is also configured to perform processing on the media content 104. The media content evaluation system 102 can processes the media content 104 in order to transform the media content into a form or format in which media features can be identified and extracted. The media content 104 may include, for example, images, video, text, audio, and so forth. The media content evaluation system 102 can be configured create a text transcription of video and audio content. The media content evaluation system 102 can be configured to perform automated image recognition or image analysis on video and image content to identify text, faces, and objects present in visual media. The media content evaluation system 102 can be configured to perform automated audio analysis on audio content or on an audio track of video content, such as music, speech, noise, ambient noise, and sound effects.

Once the media content 104 and the responses 114 are processed, the media content evaluation system 102 can be configured to perform feature engineering, identification, selection, and extraction on the media content 104 and the responses 114. The media features of the media content 104 can include content (e.g., images, audio, text, topics, theme, etc.) that potentially influence a human respondent viewing the media content 104. The features of the responses 114 can include demographic data, responses to questions, statistical scores, etc., which are extracted or derived from the responses 114. The features of the responses 114 can provide insight into a human respondent's reaction to the media content 104.

The media content evaluation system 102 can be configured to automatically process text, either native or from transcription or recognition, to extract specific features to train the models. For example, the features can include features of the media content 104 such as presence and types of pronouns used, tense of verbs, topics extracted via topic modeling, sentiment, parts of speech, etc. The media content evaluation system 102 can be configured to perform image analysis on video or still images to find or calculate features such as saturation, hues, sharpness, noise, other statistics of the image, etc. Likewise, for example, the media content evaluation system 102 can be configured to automatically process the output of image recognition to find features such as: the fraction of time that a face is present and facing the camera, presence of celebrities or politicians, presence of symbols such as flags, etc. The media content evaluation system 102 can be configured to perform audio analysis of audio content or on an audio track of video content to find or calculate features such as musical key, beats per minute, recognition of effects like laughter or dogs barking, ambient noise, etc.

The media content evaluation system 102 can be configured to perform topic modeling based on object detected in the media content 104. For example, for objects detected in an image or video, the media content evaluation system 102 can extract the labels from the objects and combine the labels as a bag of words. The media content evaluation system 102 can be configured to perform topic modeling on the bag of words in order to extract a topic of the media content as a feature.

Additionally, the media content evaluation system 102 can be configured identify and encode the media content 104 with features of the media content, such as production quality, mood, use or humor or sarcasm, etc. In some implementations, the media content evaluation system 102 can automatically identify and encode the media content 104 with the features. In some implementations, the media content evaluation system 102 can utilize human users to identify and/or encode the features of the media content 104.

The media content evaluation system 102 is also configured to identify and determine features that are shared or potentially correlated between the media content 104 and the response 114. For example, the media content evaluation system 102 can be configured to determine cross terms. In some implementations, the cross terms can combine features of the media content 104 with features of the responses 114, for example, using humor with a person under the age of 35, humor on scale of 0-10, multiple by age, other mathematical processing, etc.

After the features are determined, the media content evaluation system 102 is configured to train a model utilizing the features. The media content evaluation system 102 is configured to utilize any type of machine learning model that can determine and predict the impact or influence of a piece of media content 104. For example, the media content evaluation system 102 can utilize a linear regression, a random forest, extremely randomized trees, a neural network, etc.

The media content evaluation system 102 is configured to train the model on the data set including the responses 114 (raw data and determined features) and the features of the media content 104 consumed by the group of respondents 106. For example, the input features of the model can include demographic, geographic, and behavioral characteristics of a respondent from the group of respondents 106, media features extracted from the visual, audio, and text of the media content 104 consumed by a respondent from the group of respondents 106. Likewise, for example, the input features of the model can also include cross terms between the characteristics of a respondent from the group of respondents 106 and the media content 104.

Once trained, the model is configured to output an importance indication for features of the media content 104, a direction of influence for the features of the media content 104, and/or an influence score for the media content 104. For example, the model can be configured to output the answer to an individual psychographic question related to a topic of the media content 104 and/or an IMM (e.g., average of multiple questions) related to the topic of the media content 104. Likewise, for example, the model can be configured to output, for particular features, the feature importance and the directionality of the influence of the presence of a feature. The features importance and directionality identifies which features of the media content 104 matter and whether they have a positive or negative influence on an individual's opinion related to the topic, e.g., does the use of a positive sentiment work overall. For example, when a feature is a cross term between a feature of the media content 104 and a characteristic dimension of an respondent, the feature importance and directionality identifies how the efficacy of that feature may vary with the characteristic dimension of individuals, e.g., does positive sentiment have a positive effect for a young audience and a negative effect for an older audience. Additionally, for example, when trained, the model can automatically and instantaneously predict the impact of any media content 104 (e.g., new media content) on opinions, beliefs, or intentions for individuals given their demographic, geographic, and psychographic characteristics, and can automatically provide extracted features of the media content 104 and the importance and directionality of the extracted features.

In various implementations, the media content evaluation system 102 (and the components of the media content evaluation system 102) are implemented as software programs or modules that perform the methods, process, and protocols described herein. The software programs or modules can be written in a variety of programming languages, such as JAVA, C++, Python code, Visual Basic, hypertext markup language (HTML), extensible markup language (XML), and the like to accommodate a variety of operating systems, computing system architectures, etc.

In various implementations, the media content evaluation system 102 can communicate and utilize other computer systems to perform the process described herein. The media content evaluation system 102 can be configured to communicate with and utilize one or more cloud computer systems 118 via the network 105. The cloud computer system 118 can be configured to provide computer resources or services to the media content evaluation system 102. The services can include image recognition, transcription, human tagging, (e.g., Mechanical Turk), etc. For example, the media content evaluation system 102 can be configured to utilize the cloud computer systems 118 in order to transform the data stored in the database 116, train the model, etc. The cloud computer system 118 can be privately operated cloud systems or public cloud systems (e.g., AMAZON AWS, GOOGLE Cloud Platform, etc.)

The network 105 can include local area networks (LANs), wide area networks (WANs), telephone networks, such as the Public Switched Telephone Network (PSTN), an intranet, the Internet, or combinations thereof. It should be understood that where the terms server or computer system are used, this includes the use of networked arrangements of multiple devices operating as a server or computer system. For example, distributed or parallel computing can be used.

Figure 2:
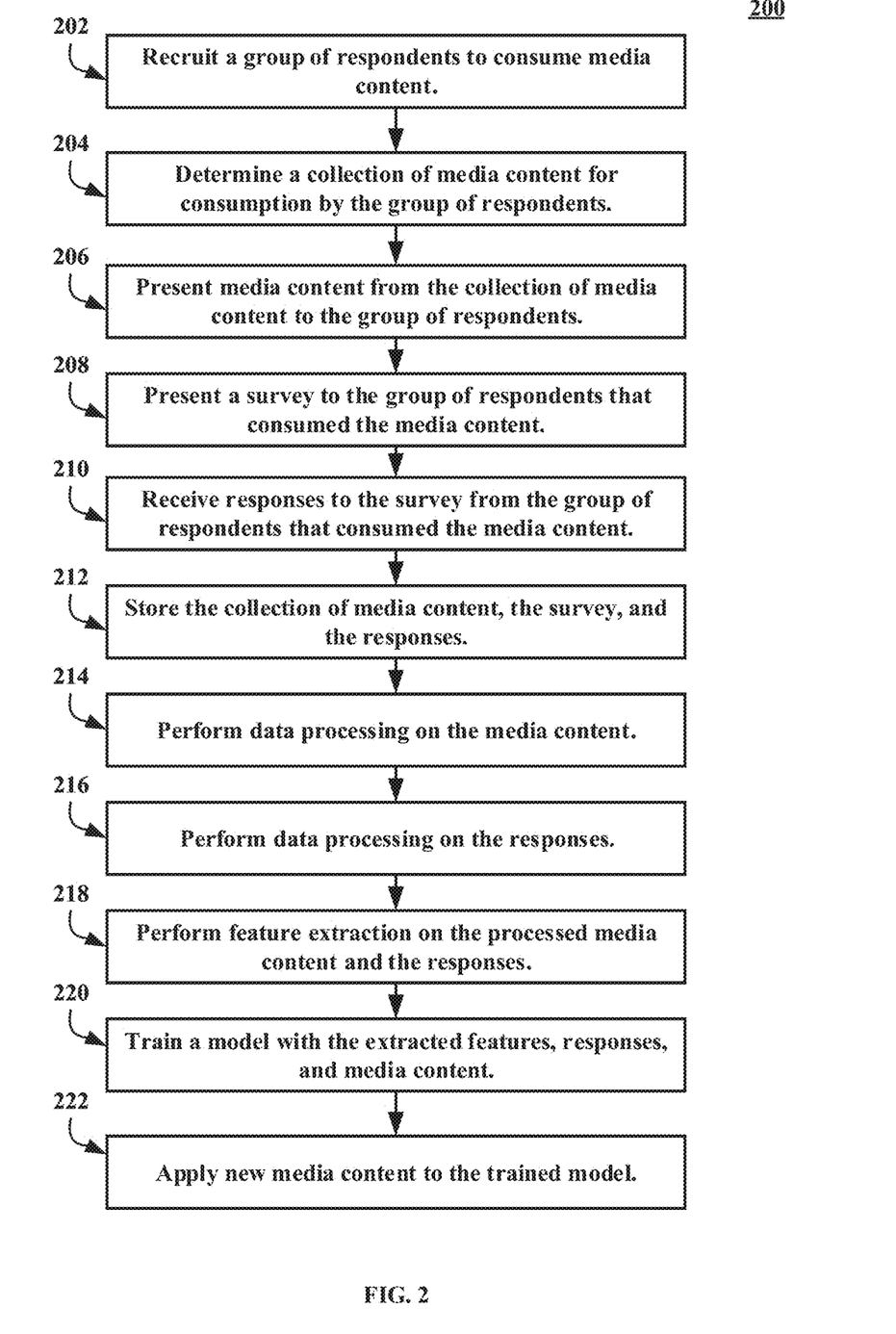
FIG. 2 illustrates an example of a method for analyzing digital content, according to various implementations.

FIG. 2 illustrates an example of a method 200 for analyzing digital media content, according to various implementations. While FIG. 2 illustrates various stages that can be performed, stages can be removed and additional stages can be added. Likewise, the order of the illustrated stages can be performed in any order.

In 202, a group of respondents can be recruited to consume media content. In some implementations, the media content evaluation system 102 can utilize the network 105 to recruit the group of respondents 106. For example, the media content evaluation system 102 can transmit electronic message to one or more users attached to the network 105, place advertisements on one or more network sites, place posts on social media application or sites, recruit the users of mobile apps, etc.

In some implementations, the group of respondents 106 recruited can include any user connected to the network 105 and/or particular users related to topics and subject matter of the media content 104. For example, the media content evaluation system 102 can target recruitment to a particular state for political surveys, can target people demographically based on topics and subject matter. In some implementations, the media content evaluation system 102 can filter and select the group of respondents 106 based on one or more factors. For example, media content evaluation system 102 can filter or select qualification based on network application data (e.g., type of computer system, software, cell phone and the like used, usage and preference data collected for the user, etc.), pre-qualifying questions answered, etc.

In 204, a collection of media content is determined for consumption by the group of respondents. In some embodiments, the collection of media content can include any number of pieces of media content 104 for consumption. The collection of the media content 104 can include target media content that is intended to persuade or influence a human on a subject or topic. The collection of the media content 104 can also include control media content that is neutral on the subject or topic. The media content 104 can include video files, audio files, image files, text files, and the like.

For example, the collection of the media content 104 can include test media content that is intended to persuade or influence a human on climate change, whether positively or negatively. Additionally, the collection of the media content 104 can include control media content that is directed to neutral content such as the effects of texting and driving.

In 206, media content from the collection of media content is presented to the group of respondents. In some implementations, the media content evaluation system 102 can present the media content 104 in a network application (e.g., web browser) for consumption by the group of respondents 106 via the network 105. In some implementations, the media content evaluation system 102 can transmit an electronic copy of the media content 104 to the group of respondents 106 via the network 105, for viewing on a computer system of the group of respondents 106. In some implementations, the media content evaluation system 102 can provide access and/or a link to an electronic copy of the media content 104 for download via the network 105.

In some implementations, the media content evaluation system 102 can present the test media content to the test respondents 108 in the group of respondents 106 can present the control media content to the control respondents 110 in the group of respondents 106, or combinations of both. In some implementations, each of the test respondents can be presented one piece of the test media content. In some implementations, each of the test respondents can be presented several pieces of the test media content. In some implementations, each of the control respondents can be presented one piece of the control media content. In some implementations, each of the control respondents can be presented several pieces of the control media content.

For instance, in the example discussed above, the media content evaluation system 102 can present one piece of the climate change media content to the test respondents 108. Likewise, the media content evaluation system 102 can present one piece of the texting and driving media content to the control respondents 110.

In 208, a survey is presented to the group of respondents that consumed the media content. In some implementations, the media content evaluation system 102 can present the survey 112 in a network application (e.g., web browser) for consumption and response by the group of respondents 106 via the network 105. In some implementations, the media content evaluation system 102 can transmit an electronic copy of the survey 112 to the group of respondents 106 via the network 105. In some implementations, the media content evaluation system 102 can provide access and/or a link to an electronic copy of the survey 112 for download via the network 105.

In some implementations, the survey 112 can include questions to acquire data about the group of respondents 106 and the group of respondents 106 reaction to the media content 104. The survey 112 includes questions that determine demographic, geographic, and behavioral information for the group of respondents 106. The questions can include birth year, gender, ethnicity, postal code, education level, annual income, religion, religiosity, political beliefs, marital status, children living in-home, etc. The survey 112 also includes questions about the respondents' opinions, beliefs, and intentions to act with respect to a subject treated by some of the media content 104. In some implementations, the survey 112 can include approximately 10-25 questions. In some implementations, the survey 112, which is presented to the group of respondents that viewed the test media content, can include the same questions as the survey 112 that is presented to the group of respondents that the control media content.

For instance, in the example described above, the survey 112 can include questions that determine the demographics of the group of respondents 106. The survey 112 can also include questions to determine the attitudinal opinions on the topic of climate change. For example, a question can include "Do you agree or disagree with the statement that it is important for the gov't to take action on climate change?" The survey 112 can also include questions to determine the beliefs on the topic of climate change. For example, questions can include "Do you believe climate change is real?" and "Do you think it is important to vote?" The survey 112 can also include questions to determine behavior of the group of respondents 106 related topic of climate change. For example, a question can include "Do you intend to vote?"

In 210, responses to the survey are received from the group of respondents. In some implementations, the group of respondents 106 can enter the responses 114 in the survey 112 in a network application (e.g., web browser). In some implementations, the group of respondents 106 can transmit an electronic copy of the responses 114 to the media content evaluation system 102 via the network 105. In some implementations, the group of respondents 106 can provide access and/or a link to an electronic copy of the responses 114 for download by the media content evaluation system 102 via the network 105.

In 212, the collection of media content, the survey, and the responses are stored. In some implementations, the media content evaluation system 102 can store the collection of media content, the survey, and the responses can be stored in the database 116. In some implementations, the collection of media content and the survey can be stored prior to presentation to the group of respondents, and the responses are stored once received.

In 214, data processing is performed on the media content. In some implementations, the media content evaluation system 102 can perform processing on the media content 104 in order to transform the media content 104 into a form or format in which media features can be identified and extracted. In some implementations, the media content evaluation system 102 can utilize other computer systems, e.g., the cloud computer systems 118, to perform some the processing on the media content 104.

For example, the media content evaluation system 102 (or other computer system) can perform processing such as create a text transcription of video and audio content, to perform automated image recognition on video and image content to identify text, faces, and objects present in visual media, human tagging on the media content 104, and the like.

In 216, data processing is performed on the responses. In some implementations, the media content evaluation system 102 can transform the responses 114 received from the group of respondents 106 into a form that can be utilized in training a model.

In some implementations, the media content evaluation system 102 can calculate individual characteristics of each respondent in the group of respondents 106 based on raw survey answer. For example, the media content evaluation system 102 can calculate the age of the respondent from a birth year, local population density from a postal code, etc.

In some implementations, the media content evaluation system 102 can calculate psychographic data based on the responses 114. For example, the media content evaluation system 102 can be configured to compute a psychographic index by averaging the responses of multiple related questions together using, for example, statistical techniques such as an "index of multiple measures" (IMM). For instance, in the example discussed above, if three questions concern climate change, the media content evaluation system 102 can average scores from the questions together and determine a composite score that represents how much a respondent cares about climate change (e.g., a score of 0-10, 0-100, etc.). Additionally, the media content evaluation system 102 can perform mathematical processing (e.g., adding numeral scores 10) when the number entered if the question is framed in the opposite viewpoints (e.g., Do you care about climate change? Do you not care about climate change?).

Additionally, the media content evaluation system 102 can perform data conditioning processes on the responses 114, for example, outlier dropping, quality checks, etc. For example, the media content evaluation system 102 can be configured to drop responses 114 due to duplication or other quality issues such as failing an attention check question, submitting a response from outside the targeted locale, and/or determining that the respondent is not a valid respondent (e.g., spammer).

In 218, feature extraction is performed on the processed media content and responses. In implementations, the media content evaluation system 102 can perform the feature extraction on the media content 104, the responses 114, and combinations of both.

In some implementations, the media content evaluation system 102 can automatically process text, either native or from transcription or recognition, to extract specific features to train the models. For example, the features can include features of the media content 104 such as presence and types of pronouns used, tense of verbs, topics extracted via topic modeling, sentiment, parts of speech, etc. Likewise, for example, the media content evaluation system 102 can automatically process the output of image recognition to find features such as: the fraction of time that a face is present and facing the camera, presence of celebrities or politicians, presence of symbols such as flags, etc.

In some implementations, the media content evaluation system 102 can extract relevant features from demographic, geographic, and behavioral characteristics of a respondent from the group of respondents 106. In some implementations, the media content evaluation system 102 can determine cross terms between the characteristics of a respondent from the group of respondents 106 and the media content 104 as a feature. For example, the media content evaluation system 102 can combine a feature of the respondent with a feature of the media content 104, for example, using humor with a person under a certain age, e.g., 35. The media content evaluation system 102 can utilize any mathematical function such as a binary or numerical operation to determine cross terms, e.g., humor score*age.

In 220, a model is trained with the extracted features, the responses, and the media content. In some implementations, the model can include a linear regression, a random forest, extremely randomized trees, a neural network, etc. In some implementations, a model can be trained for each topic or subject.

In some implementations, the media content evaluation system 102 can train the model with groups of respondents, such as, the test respondents 108 and the control respondents 110. For example, the media content evaluation system 102 can compare the responses 114 from the test respondents 108 and the responses 114 from the control respondents 110. The media content evaluation system 102 can combine the responses 114 from the test respondents 108 into one observation/example for a piece of media content 104 and can combine the responses 114 from the control responses 110 into 1 observation/example. The delta between the control and the test can be used as an outcome variable of the model. For example, if the media collection includes ten pieces, the media content evaluation system 102 can produce ten observations examples.

For instance, in the example described above, the media content evaluation system 102 can average scores of the control respondents 110 which viewed the media content on texting and driving and average scores of the test respondents which viewed a one piece of media content on climate change to produce on observation/example. The media content evaluation system 102 can then calculate a difference between the averages. As such, the media content evaluation system 102 attempts to isolate the impact of the media content and take out the baseline of what people think about that topic (i.e., those who viewed unrelated content). In this example, each observation/example corresponds to a piece of test media content. For example, if the media collection contains 500 pieces of media content on climate change, the media content evaluation system 102 can train on those 500 pieces and can predict the feature impact (i.e., the delta).

Once trained, the model is configured to output an importance indication for features of the media content 104, a direction of influence for the features of the media content 104, and/or an influence score for the media content 104. For example, the model can be configured to output the answer to an individual psychographic question related to a topic of the media content 104 and/or an IMM (e.g., average of multiple questions) related to the topic of the media content 104. Likewise, for example, the model can be configured to output, for particular features, the feature importance and the directionality of the influence of the presence of a feature. The features importance and directionality identifies which features of the media content 104 matter and whether they have a positive or negative influence on an individual's opinion related to the topic, e.g., does the use of a positive sentiment work overall. For example, when a feature is a cross term between a feature of the media content 104 and a characteristic dimension of an respondent, the feature importance and directionality identifies how the efficacy of that feature may vary with the characteristic dimension of individuals, e.g., does positive sentiment have a positive effect for a young audience and a negative effect for an older audience. Additionally, for example, when trained, the model can automatically and instantaneously predict the impact of any media content 104 (e.g., new media content) on opinions, beliefs, or intentions for individuals given their demographic, geographic, and psychographic characteristics, and can automatically provide extracted features of the media content 104 and the importance and directionality of the extracted features.

For example, if the model is a linear regression, the model can output coefficients (high value is more important, + is positive impact, − negative impact) that represent the importance and direction of a feature. Likewise, for example, if the model is a random forest, the model can output a number that represents feature importance.

In 222, new media content can be applied to the model. In some implementations, once the model has been trained, a new piece of media content 104 can be processed and the features applied to the trained model. In response, the trained model can output an importance indication for features of the media content 104, a direction of influence for the features of the media content 104, and/or an influence score for the media content 104. As such, the persuasive value of the new media content 104 can be determined automatically without surveying human respondents.

In implementations, if the model is a deep neural network, the above method can be modified. The media content evaluation system 102 can skip media content processing and feature extraction and the binary file of media content 104 and the responses 114 into the deep neural network. The media content evaluation system 102 can determine the feature importance by examining the layers of the deep neural network.

In implementations, the model used in the method 200 can also include symbolic regression and genetic algorithm/ evolutionary algorithm. In this example, the model can output a smooth mathematical function for the importance of features and the impact of the media content 104.

Figure 3:
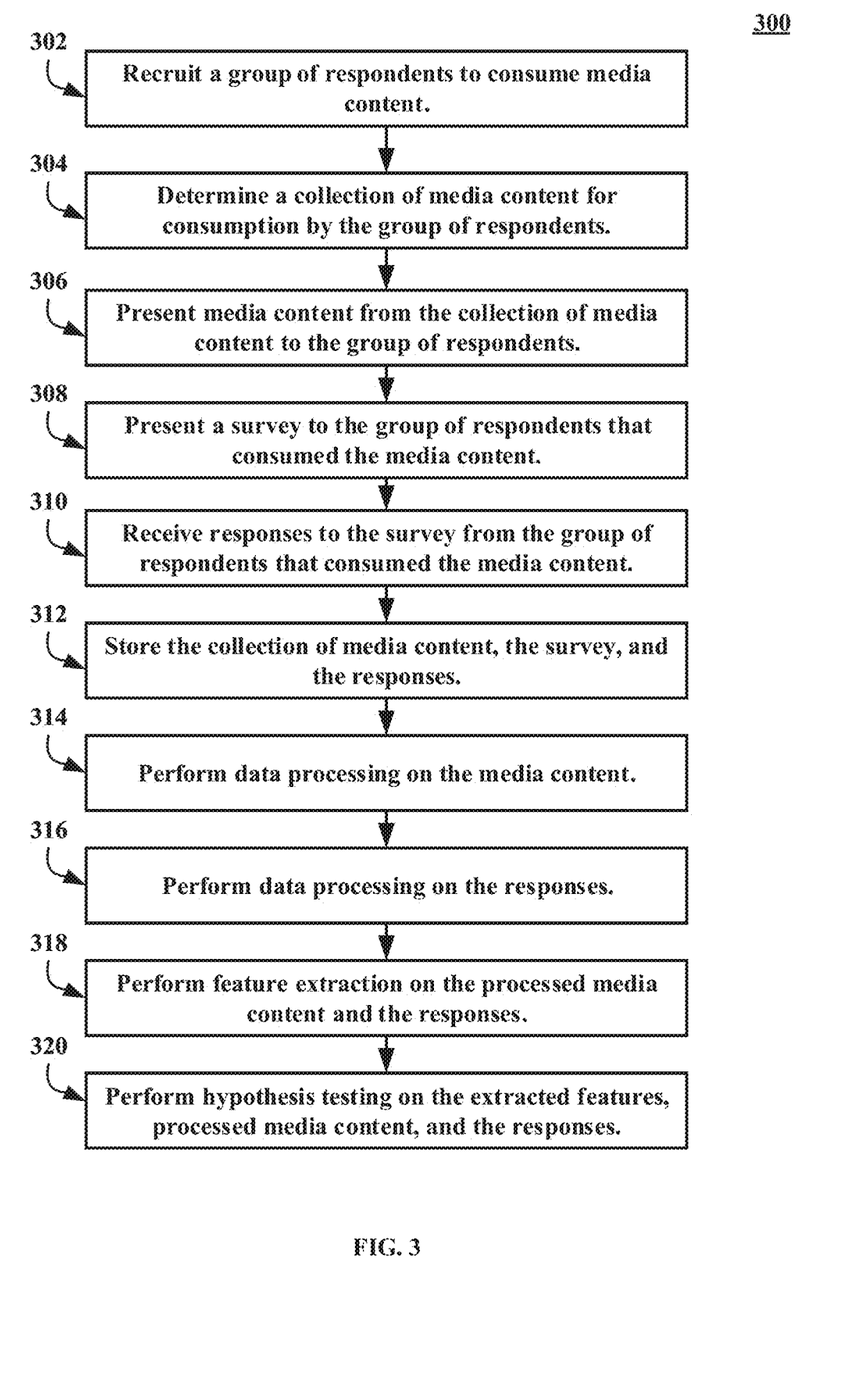
FIG. 3 illustrates an example of another method for analyzing digital content, according to various implementations.

FIG. 3 illustrates another example of a method 300 for analyzing digital media content, according to various implementations. While FIG. 3 illustrates various stages that can be performed, stages can be removed and additional stages can be added. Likewise, the order of the illustrated stages can be performed in any order.

In stages 302-318 of the method 300, the group of respondents can be recruited, a collection of media content can be determined and presented to the group of respondents, and responses can be collected and processed similar to stages 202-218 described above with reference to FIG. 2. For brevity sake, the description of stages 302-318 is incorporated from the description of FIG. 2, above. While stages 302-318 can be similar to stages 202-218, one skilled in the art will realize that any of the stages 302-318 can be modified consistent with the implementations described herein.

In 320, hypothesis testing is performed on the extracted features, the processed media content, and the responses. In some implementations, hypothesis testing can involve comparing metrics for high values of variables versus low values of variables.

In some implementations, the media content evaluation system 102 can obtain a table of observations, where each observation corresponds to a response 114 to a question in the survey 112. The features corresponding to a response 114 include features of the individual and features of the media content 104. For example, the media content evaluation system 102 can generate a table that includes columns and rows. Each column corresponds to a feature (e.g., how many faces appear in the video), and the rows are observations. The media content evaluation system 102 can rank the observations. For example, the media content evaluation system 102 can rank by how many faces appear in the video (rank by feature value).

The media content evaluation system 102 can extract the first 5%, 10%, or 20% from the table and perform a hypothesis test. For example, the hypothesis test can compare the distribution of the observations for the top X % and bottom Y %. The media content evaluation system 102 can evaluate the difference in distributions and determine the probability is that the distributions are the same. The media content evaluation system 102 can then perform a t-test. The t-test can determine if the result is statistically significant or not. If the distributions are different and the only difference is the feature of the media content 104, the media content evaluation system 102 can conclude that this feature has an impact that was a cause in that shift.

In some implementations, the media content evaluation system 102 can compare distributions over the responses 114, for example, an IMM combining multiple questions. The t-test determines how much of an impact and also statistical significance a feature from the media content can potentially provide. The media content evaluation system 102 can calculate a t-statistic that represents a measure of the magnitude of the difference. The media content evaluation system 102 can compare the average of the top to the average of the bottom. The media content evaluation system 102 can utilize the t-statistic to look at magnitude of difference. The media content evaluation system 102 can also utilize p values are common across hypothesis testing.

Figure 4:
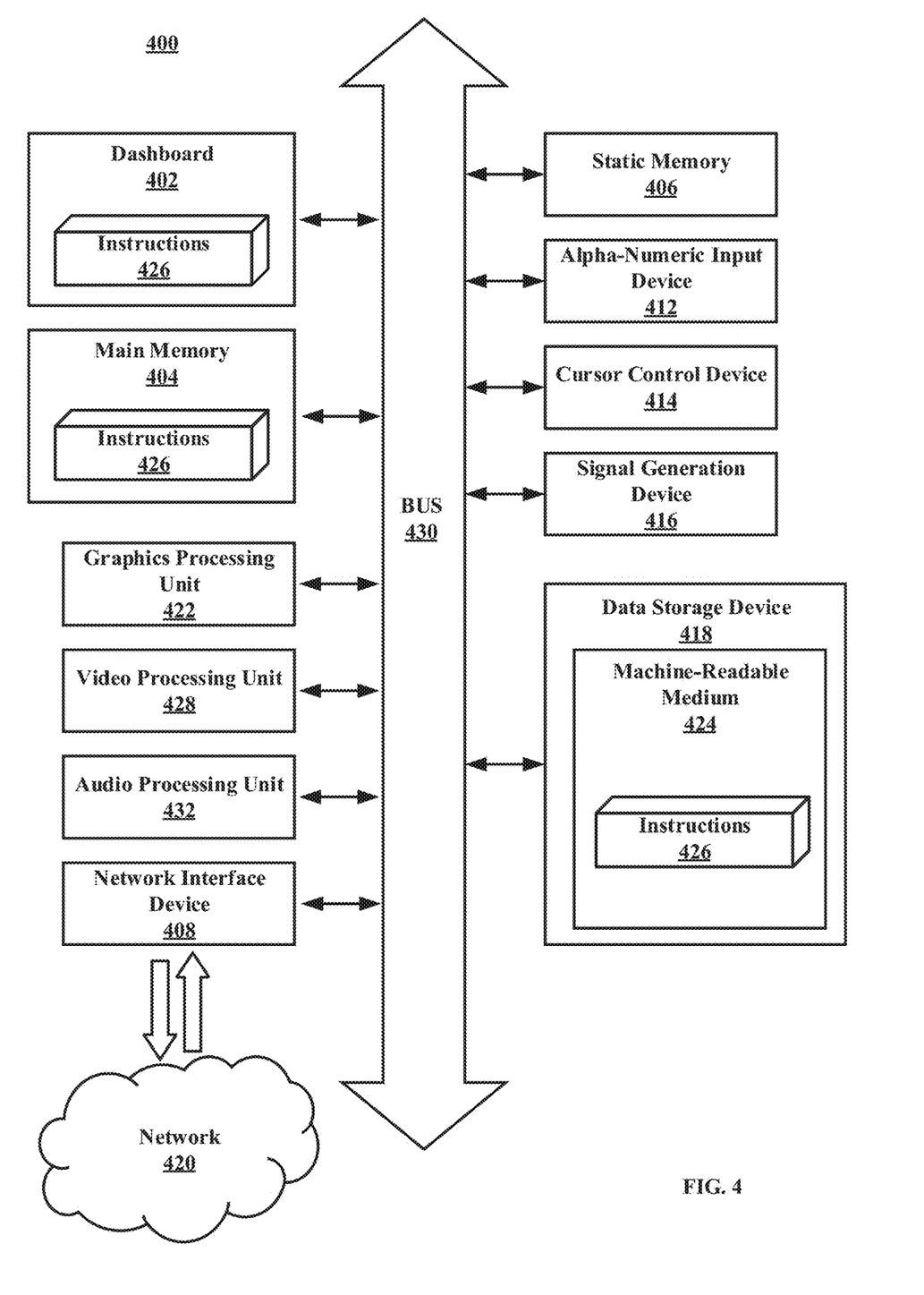
FIG. 4 illustrates an example of a computer system, according to various implementations.

FIG. 4 illustrates an example machine of a computer system within which a set of instructions, for causing the machine to perform any one or more of the methodologies discussed herein, can be executed. In implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" also includes any collection of machines that individually or jointly execute a set (or multiple sets) of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

The processing device 402 represents one or more general-purpose processing devices such as a microprocessor, a central processing unit, or the like. For example, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 further includes a network interface device 408 to communicate over the network 420. The computer system 400 also includes a video display unit 410 (e.g., a liquid crystal display (LCD) or a cathode ray tube (CRT)), an alphanumeric input device 412 (e.g., a keyboard), a cursor control device 415 (e.g., a mouse), a graphics processing unit 422, a signal generation device 416 (e.g., a speaker), graphics processing unit 422, video processing unit 428, and audio processing unit 432.

The data storage device 418 can include a machine-readable storage medium 424 (also known as a computer-readable medium) on which is stored one or more sets of instructions or software 426 embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media.

In implementations, the instructions 426 include instructions to implement functionality corresponding to the components of a device to perform the disclosure herein. While the machine-readable storage medium 424 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" also includes, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "calculating" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The present disclosure also relates to an apparatus for performing the operations herein. This apparatus can be specially constructed for the intended purposes, or it may comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, flash memory devices, or any type of media suitable for storing electronic instructions, each coupled to a computer system bus. Examples of implementations of the present disclosure can also be provided as a computer program product, or software, that may include a machine-readable medium having stored thereon instructions, which can be used to program a computer system (or other electronic devices) to perform a process according to the present disclosure.

Various general purpose systems can be used with programs in accordance with the teachings herein, or a more specialized apparatus can be utilized to perform the method. Examples of the structure for a variety of systems appear in the description above. In addition, the present disclosure is not described with reference to any particular programming language. It will be appreciated that a variety of programming languages may be used to implement the teachings of the disclosure as described herein.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems. Accordingly, other embodiments are within the scope of the following claims.

What is claimed is:

1. A method for analyzing digital content of electronic media files, the method comprising:
    determining a collection of media content for analysis, wherein the collection of media content comprises control media content and test media content to the set of test respondents;
    determining a set of respondents to consume the collection of media content;
    dividing the set of respondents into groups, wherein each respondent in a group watches one piece of media content from the collection of media content;
    receiving, from the set of respondents, responses to a survey related to topics of the collection of media content after viewing by the set of respondents;
    storing the responses in a database, wherein the database stores the collection of media content;
    performing feature extraction on one or more pieces of media content from the collection of media content, wherein the feature extraction obtains media content features;
    calculating average corresponding responses for one or more questions in the survey from the responses to the survey, wherein the average corresponding responses correspond to a same piece of media from the collection of media content;
    calculating a delta between first corresponding responses from the average corresponding responses associated with test media content and second corresponding responses from the average corresponding responses associated with control media content;
    training a regression machine learning model with the delta between the first corresponding responses and the second corresponding responses, wherein the model, when trained, outputs one or more of an importance indication for one or more of the media content features, a direction of influence for the one or more media content features, and an influence score for new test media content; and
    determining, using the regression machine learning, model cross-terms between the response features and the media content features, wherein the regression machine learning model is trained with the cross-terms.

2. The method of claim 1, the method further comprising:
    applying new media content to the model that was trained; and
    obtaining, from the model an influence score of the new media content.

3. The method of claim 1, wherein the test media content and the control media content comprise one or more of audio content, image content, video content, and text content.

4. The method of claim 1, wherein the media content features comprise data about one or more objects, themes, concepts, characteristics, or statistics represented in the test media content.

5. The method of claim 4, wherein the one or more media content features are determined based on image recognition or image analysis performed on the test media content.

6. The method of claim 4, wherein the one or more media content features are determined based on text transcription performed on the test media content.

7. The method of claim 4, wherein the one or more media content features are determined based on audio analysis performed on the test media content.

8. The method of claim 1, the method further comprising:
    determining one or more of the first responses and the second responses that qualify as outlier responses; and
    removing the one or more of the first responses and the second responses that qualify as outlier responses from the database.

9. The method of claim 1, wherein performing feature extraction on the first responses and the second responses comprises:
    determining an index of multiple measures (IMM) score for one or more of the first responses or the second responses, wherein the response features comprise the IMM score.

10. The method of claim 1, wherein the model, when trained, outputs an index of multiple measures (IMM) score.

11. A method for analyzing digital content of electronic media files, the method comprising:
    determining a collection of media content for analysis, wherein the collection of media content comprises control media content and test media content to the set of test respondents;
    determining a set of respondents to consume the collection of media content;
    dividing the set of respondents into groups, wherein each respondent in a group watches one piece of media content from the collection of media content;
    receiving, from the set of respondents, responses to a survey related to topics of the collection of media content after viewing by the set of respondents;
    storing the responses in a database, wherein the database stores the collection of media content;
    performing feature extraction on one or more pieces of media content from the collection of media content, wherein the feature extraction obtains media content features;
    calculating average corresponding responses for one or more questions in the survey from the responses to the survey, wherein the average corresponding responses correspond to a same piece of media from the collection of media content;
    calculating a delta between first corresponding responses from the average corresponding responses associated with test media content and second corresponding responses from the average corresponding responses associated with control media content;
    training a regression machine learning model with the delta between the first corresponding responses and the second corresponding responses, wherein the model, when trained, outputs one or more of an importance indication for one or more of the media content features, and an index of multiple measures (IMM) score, a direction of influence for the one or more media content features, and an influence score for new test media content; and
    determining, using the regression machine learning model, the IMM score.

12. The method of claim 11, the method further comprising:
 determining, using the regression machine learning model, cross-terms between the response features and the media content features, wherein the regression machine learning model is trained with the cross-terms.

13. The method of claim 11, wherein performing feature extraction on the first responses and the second responses comprises:
 determining the IMM score for one or more of the first responses or the second responses, wherein the response features comprise the IMM score.

\* \* \* \* \*